United States Patent

[11] 3,578,868

[72] Inventors Helmut Friedrich Wopkemeier Dehme;
Werner Richter, Herford, Germany
[21] Appl. No. 759,387
[22] Filed Sept. 12, 1968
[45] Patented May 18, 1971
[73] Assignee Werkzeugmaschinenfabrik Gildemeister & Comp, AKT.-Ges
Bielefeld, Germany
[32] Priority Sept. 15, 1967
[33] Germany
[31] P 16 27 041.0

[54] APPARATUS FOR FACILITATING PRECISION MOUNTING OF TOOLS IN TOOL HOLDERS
10 Claims, 6 Drawing Figs.
[52] U.S. Cl. .................................................. 356/165, 33/185, 350/81, 356/168
[51] Int. Cl. ................................................... G01b 9/08, B27g 23/00
[50] Field of Search........................................ 356/164, 6, 168; 350/81; 33/185

[56] References Cited
UNITED STATES PATENTS

| 2,485,355 | 10/1949 | Brennan | 356/164 |
|---|---|---|---|
| 2,487,314 | 11/1949 | Coles | 356/164 |
| 2,488,351 | 11/1949 | Turrettini | 356/164 |
| 2,521,820 | 9/1950 | Beardsley et al. | 356/164 |
| 2,581,823 | 1/1952 | Turrettini | 356/164 |
| 2,592,264 | 4/1952 | Fultz | 356/164 |
| 2,614,368 | 10/1952 | Polk et al. | 356/164 |
| 2,625,076 | 1/1953 | Nosco | 356/166 |
| 2,796,672 | 6/1957 | Oesterheld | 356/168 |
| 2,887,827 | 5/1959 | Conte et al. | 356/164 |
| 2,933,013 | 4/1960 | Baker et al. | 356/164 |
| 3,002,421 | 10/1961 | Koulicovitch | 356/164 |
| 3,036,493 | 5/1962 | Mottu et al. | 356/164 |
| 3,334,541 | 8/1967 | Delp | 350/81 |
| 3,401,592 | 9/1968 | Altman | 356/165 |

FOREIGN PATENTS

| 131,954 | 0/1951 | Sweden | 356/164 |

OTHER REFERENCES

Bausch & Lomb, Toolmakers' Microscope, Cat. No. 33-14-06, 1957 pp. 1— 8.

Primary Examiner—Ronald L. Wibert
Assistant Examiner—J. Rothenberg
Attorney—Michael S. Striker ABSTRACT: Apparatus for facilitating precision mounting of tools in tool holders prior to insertion of tool holders into spindles, carriages and/or turrets of machine tools comprises a base supporting a rotary spindle for one type of tool holders and having a flat surface adapted to support another type of tool holders. The base is provided with horizontal ways for a first carriage which has ways for a second carriage. The first and second ways are normal to each other and one thereof is parallel to the axis of the spindle and to the plane of the flat surface. Measuring devices are provided on the base and on the two carriages to facilitate movement of carriages to predetermined positions with reference to a holder on the flat surface or with reference to a holder in the spindle. The second carriage is provided with a locating device which enables the operator to install a tool in a predetermined position with reference to a holder in selected positions of the carriages.

Inventors:
Helmut F. Wöpkemeier
Werner Richter
by Michael S. Striker.
Attorney

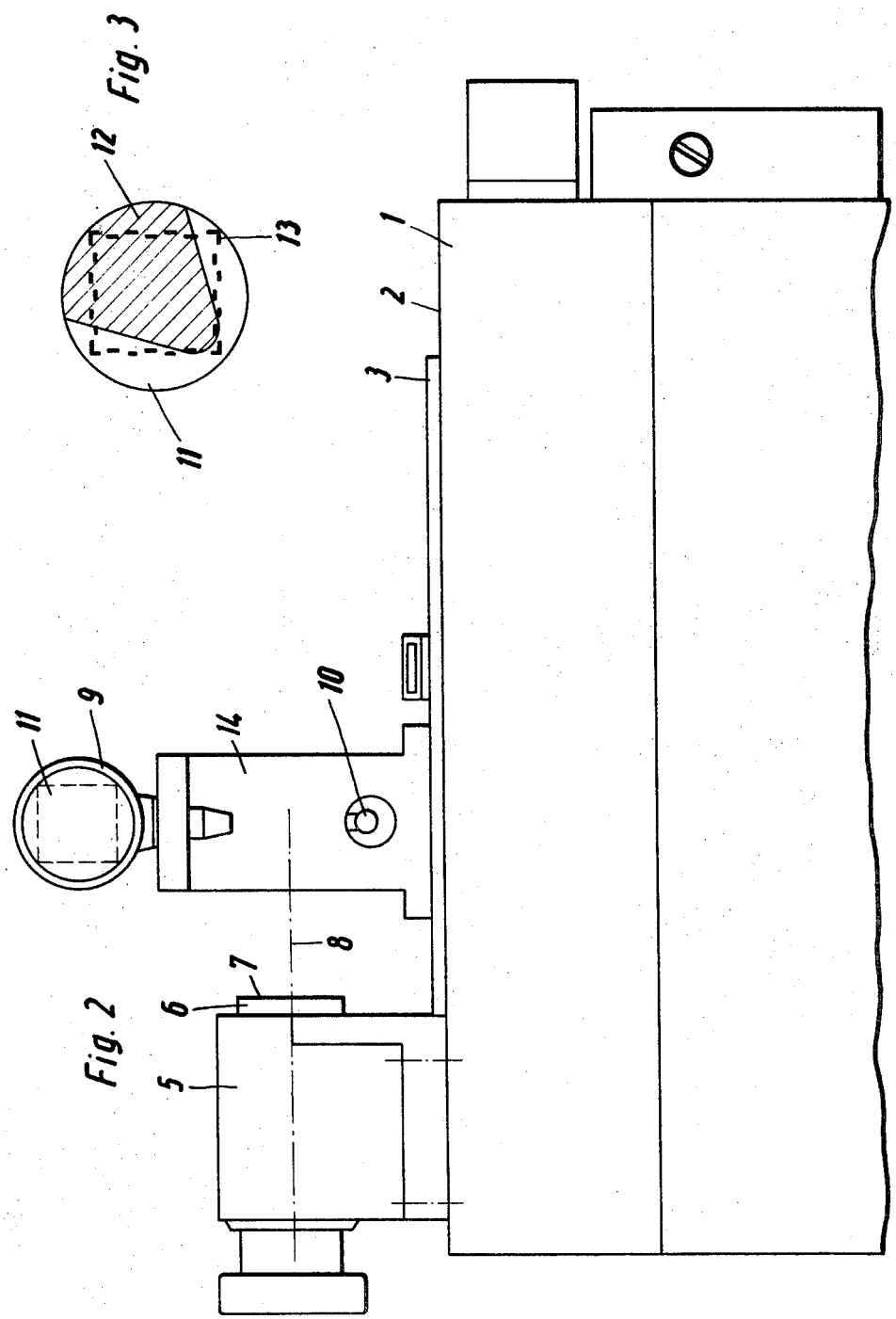

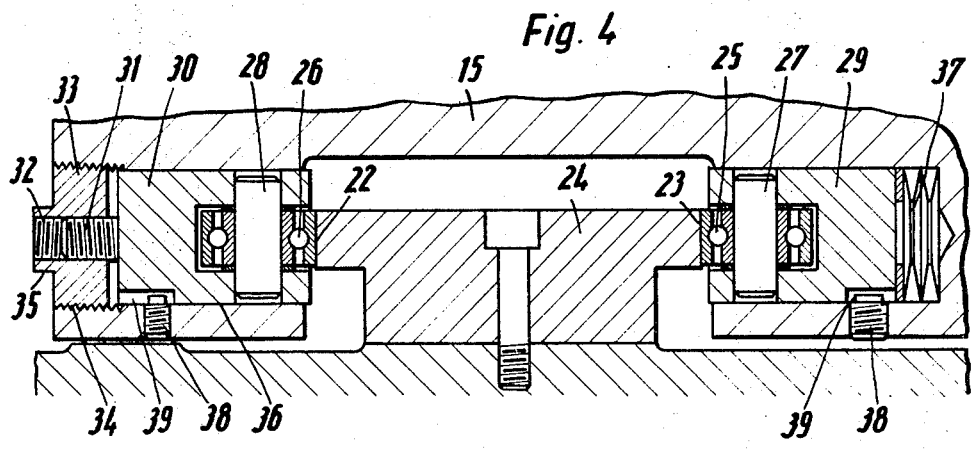
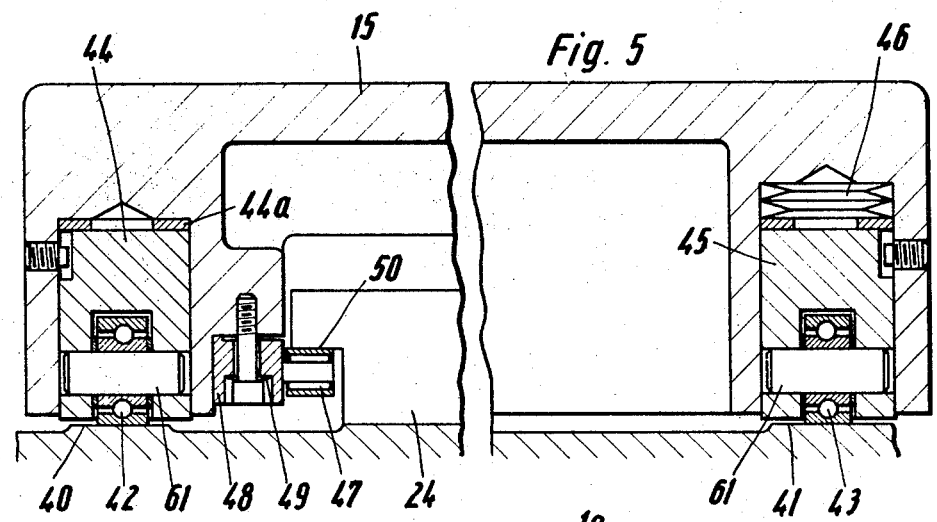
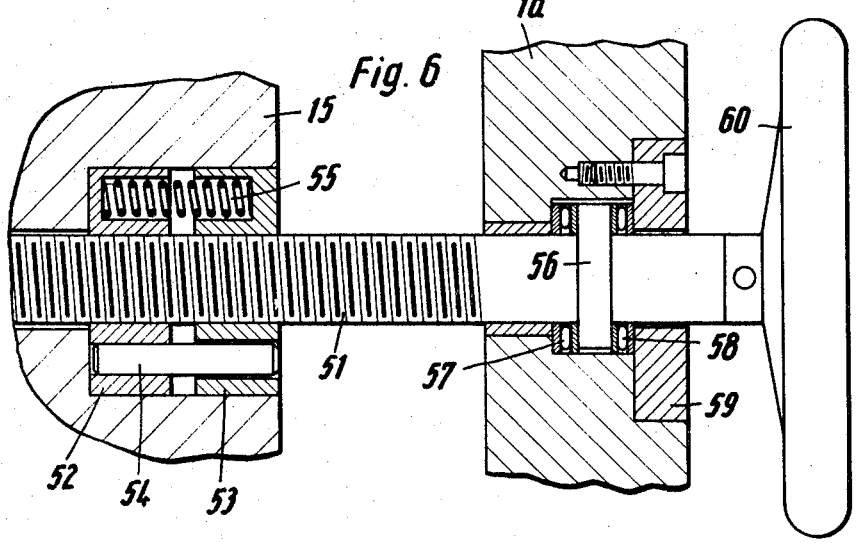

APPARATUS FOR FACILITATING PRECISION MOUNTING OF TOOLS IN TOOL HOLDERS

BACKGROUND OF THE INVENTION

The present invention relates to apparatus for facilitating precision mounting of cutting, boring, drilling or like tools in tool holders preparatory to installation of such tool holders in spindles, slides and/or turrets of machine tools. For example, the apparatus can be utilized for accurate mounting of bits in tool holders prior to insertion of such holders into the tool spindle of a lathe or into or onto the main slide or cross slide of a similar machine tool.

A drawback of presently known apparatus of the just outlined character is that they are not sufficiently versatile, i.e., that they can only be used for precision mounting of certain specific types of tools in certain specific types of holders for use in a single machine tool. As a rule, such conventional apparatus can be used for mounting of tools which are intended to perform a single type of material removing work, for example, boring or turning. In many instances, the supports for holders which are employed in such apparatus are not identical with the supports of machine tools. This leads to inaccuracies and necessitates lengthy adjustments subsequent to mounting of a tool holder in the spindle, turret or slide of a machine tool. Additional inaccuracies often develop due to the fact that the carriages of conventional assembling apparatus are mounted on customary ways with at least some horizontal and/or vertical play. It is therefore customary to lock the carriages in position prior to determination of location of a tool which is inserted into the holder. However, and since the carriages are shifted in unlocked positions, the application of locking force invariably causes at least some further displacement of carriages and the resulting errors in positioning of carriages prior to measurement affect the degree of accuracy with which the tool is mounted in its holder. Additional problems arise in connection with the well-known stick-slip phenomenon which is observable when a carriage is to be shifted by a small fraction of a millimeter along elongated ways or like guide means.

SUMMARY OF THE INVENTION

An object of our invention is to provide a novel and improved apparatus which can be used for precision mounting of different types of tools in different types of tool holders and wherein proper mounting of tools in their holders consumes little time.

Another object of the invention is to provide an apparatus wherein the carriages need not be locked to their guides prior to determination of the position of tools in their holders.

A further object of the invention is to provide novel and improved means for greatly reducing or for eliminating play between carriages and their guides in an apparatus of the above outlined character.

An additional object of the invention is to provide an apparatus wherein widely different types of tools can be mounted in widely different types of tool holders with the same degree of accuracy and in a time-saving manner.

Still another object of the invention is to provide an apparatus wherein the tools can be assembled with their holders with such accuracy that the holders can be installed and clamped or otherwise retained in machine tools without any further adjustment or with minimal additional adjustment.

The improved apparatus comprises essentially a base or bed having support means for tool holders, first guide means or ways provided on the base, a first carriage reciprocable along the first ways and having second guide means or ways extending at right angles to the first ways, a second carriage reciprocable along the second ways, measuring means for indicating the positions of carriages with reference to the support means (and more particularly with reference to a tool holder in or on the support means), and locating means for facilitating the placing of a tool in a predetermined position with reference to a holder in selected positions of the carriages. The support means may comprise a plurality of supports one of which can be provided with a flat surface for supporting tool holders of the type used in or on main slides or cross slides of machine tools and another of which can support a spindle which has a receiving means for releasably retaining a tool holder and is rotatable about an axis which is parallel to one of the ways. The measuring means may comprise two measuring devices one of which includes cooperating parts mounted on the base and on the first carriage and the other of which includes cooperating parts mounted on the first and second carriages.

The apparatus further comprises novel means for reducing or eliminating play between the ways and the respective carriages.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a front elevational view as seen from the left-hand side of FIG. 1;

FIG. 3 illustrates a detail of the locating means;

FIG. 4 is an enlarged fragmentary transverse vertical sectional view of the first carriage;

FIG. 5 is another fragmentary transverse vertical sectional view of the first carriage; and FIG. 6 is an enlarged fragmentary horizontal sectional view of a carriage.

DESCRIPTION OF THE PREFERRED EMBODIMENTS

Figure 1:
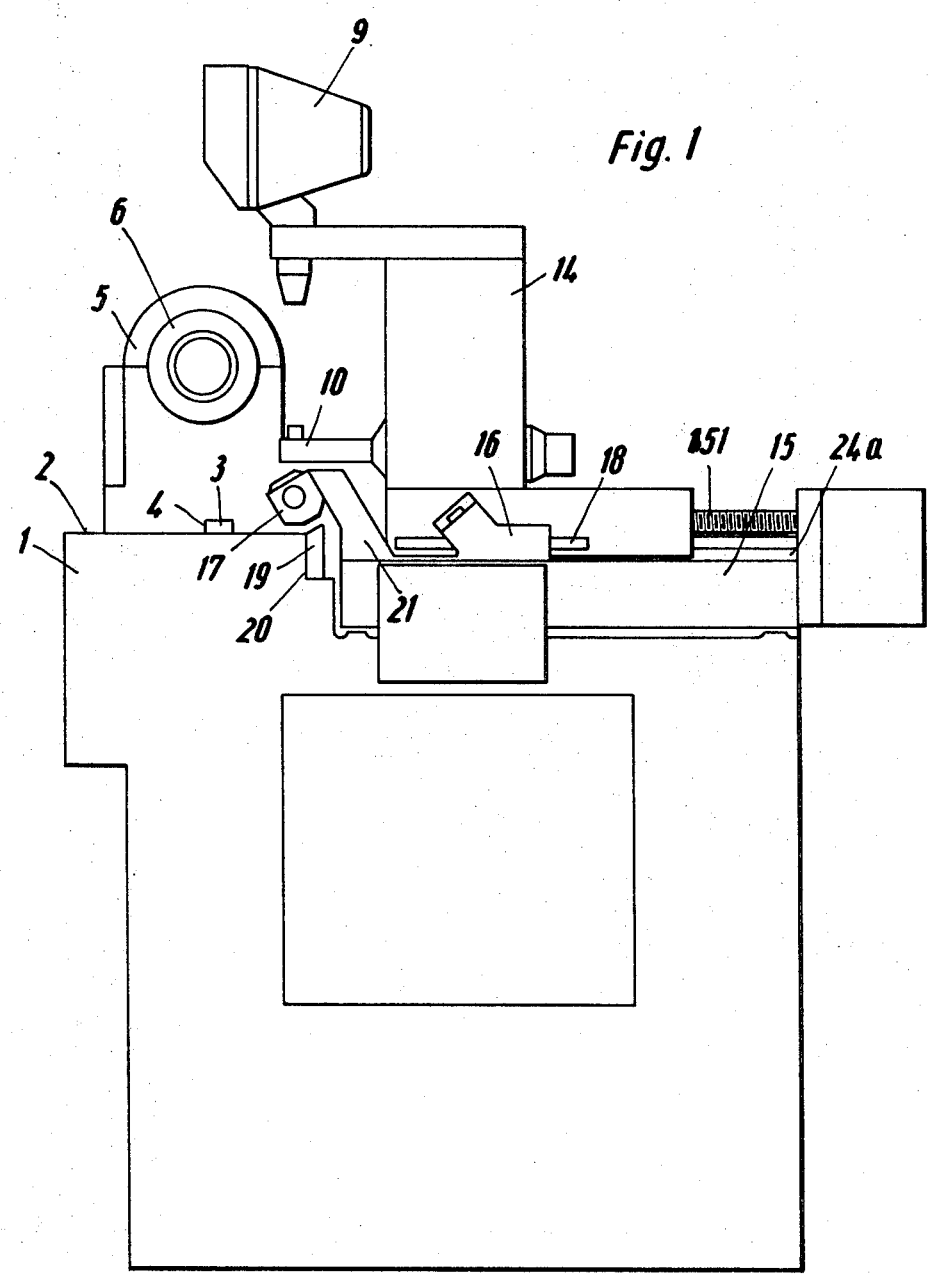
FIG. 1 is a side elevational view of an apparatus which embodies the invention.

The apparatus which is shown in FIGS. 1 and 2 comprises a base or bed 1 having a smooth flat horizontal top surface 2 and carrying at least one elongated positioning member 3 which extends beyond the top surface 2. This positioning member resembles a strip and has a straight vertical side face 4. The base 1 further carries a fixedly mounted housing or support 5 for a spindle 6 which is rotatable therein about a horizontal axis 8. The spindle 6 is provided with a chuck 7 or analogous retaining means for a removable tool holder (not shown). The construction and dimensions of the chuck 7 are identical with those of the chuck in a machine tool wherein the tool to be mounted in the holder accommodated in the chuck 7 is thereupon put to use. The purpose of the apparatus shown in FIGS. 1 and 2 is to permit mounting of a tool in a tool holder in such a way that the resulting assembly is ready to be inserted into the chuck slide or turret of a machine tool without any or with negligible additional adjustment. The chuck 7 of the spindle 6 can accommodate different types of tool holders, i.e., tool holders having differently configurated sockets or bores for the shanks or shafts of cutting or other tools.

The flat top surface 2 of the bed 1 can serve as a support for block-shaped tool holders which are often used on main slides or cross slides of various machine tools. The side face 4 of the member 3 allows for accurate positioning of such tool holders or of sections of tool holders. It will be noted that the base 1 carries or is provided with plural supports, namely, the support 5 and spindle 6 for rotary tool holders and the surface 2 and strip 3 for tool holders which can be used on slides.

The base 1 is further provided with straight horizontal guide means or ways 24 (FIG. 4) extending in parallelism with the plane of the top surface 2 and adjacent to one longitudinal edge of such surface. The ways 24 serve to guide and support a first or lower carriage 15 which is movable in parallelism with the positioning member 3 and axis 8.

The carriage 15 is formed with or carries second straight horizontal guide means or ways 24a (FIG. 1) extending at right angles to the ways 24 and axis 8. The ways 24a guide a second or upper carriage 14. The apparatus further comprises means for reducing or eliminating play between the carriages 14, 15 and the respective ways 24a, 24. FIGS. 4 and 5 illustrate such play eliminating means for the lower carriage 15. Referring first to FIG. 4, the ways 24 comprise an elongated T-shaped rail which is bolted to the base 1 and whose laterally extending arms or flanges are formed with parallel vertical side surfaces 22, 23. The carriage 15 accommodates antifriction bearings 25, 26 having outer races which respectively roll along the surfaces 23, 22. The inner races of the bearings 25, 26 are respectively mounted on vertical pins 27, 28 installed in horizontally reciprocable carriers or plungers 29, 30 received in bores 36 provided therefor in the carriage 15 and extending at right angles to the surfaces 22, 23. The bearings 25, 26 extend with clearance into suitable cutouts machined into the respective plungers 29, 30. These plungers are formed with axially parallel peripheral grooves 39 for the tips of screws 38 which hold the plungers against angular movement. Each plunger 30 has an externally threaded stem 31 meshing with a nut 33 which also meshes with an internally threaded portion 34 of the carriage 15 at the outer end of the respective bore 36. The nuts 33 have polygonal extensions 35 which can be rotated by a tool to thereby adjust the axial positions of the respective plungers 30. The lead of internal threads 32 in the nut 33 is different from the lead of threads 34 in the carriage 15 to insure that the plunger 30 is moved axially in response to rotation of the nut 33. The difference between the two leads is very small so that the axial position of the plunger 30 can be adjusted with a high degree of accuracy.

Each plunger 29 is biased toward the side surface 23 by a package of dished springs 37 which are inserted into the inner end of the respective bore 36. Thus, the outer races of bearings 25 are biased against the surface 23 and the outer races of bearings 26 can be maintained in abutment with the surface 22 in response to appropriate adjustment of nuts 33. The carriage 15 accommodates at least two plungers 29 and at least one plunger 30 or vice versa.

The manner in which the carriage 14 is mounted on the ways 24a of the carriage 15 is the same as shown in FIG. 4.

FIG. 5 illustrates the means which reduces or eliminates vertical play between the ways 24 and the lower carriage 15. The base 1 is provided with two slightly raised parallel horizontal tracks 40, 41 for the outer races of antifriction bearings 42, 43. The inner races of these bearings are mounted on horizontal pins 61 received in vertically reciprocable carriers or plungers 44, 45 accommodated in vertical bores machined into the underside of the carriage 15. Each plunger 44 abuts against a fixed stop 44a and each plunger 45 is biased downwardly by a package of dished springs 46. At least one but preferably two or more needle bearings 47 are mounted for rotation about horizontal axes and are carried by an adjustable insert 48 which is accommodated in a channel provided at the underside of the carriage 15 and is held therein by bolts through the intermediary of elastic washers 49. The outer race of each needle bearing 47 rolls along a horizontal bottom surface 50 of the corresponding arm of the ways 24. The springs 46 insure that the outer race of each bearing 47 remains in constant rolling engagement with the bottom surface 50. The plungers 44, 45 are held against angular movement. The carriage 15 may be provided with three plungers 44 and one plunger 45. The bearings 42 of two plungers 44 engage one of the tracks 40, 41 and the bearing 42 of the third plunger 44 engages the other track. The bearing 43 of the plunger 45 also engages the other track. Thus, the carriage 15 is supported on the tracks 40, 41 at least at three points (bearings 42) located at the corners of a triangle to thus insure elimination of appreciable play. If desired, the carriage 15 may be provided with two or more plungers 45.

The manner in which the carriage 14 is held against wobbling up and down with reference to the ways 24a is the same as shown in FIG. 5. The bearings 47 can be mounted on the ways 24 and then engage a horizontal surface or shoulder provided in or on the carriage 15. The bearings 25, 26, 42, 43, 47 are preferably roller bearings.

FIG. 6 shows the drive means for moving the carriage 15 along the ways 24. Such drive means comprises a horizontal feed screw 51 meshing with a two-piece spindle nut having coaxial portions or halves 52, 53. The portion 52 is rigidly mounted in the carriage 15, e.g., by means of screws or like fasteners, and the other portion 53 is mounted in the carriage for axial movement with reference to the portion 52. Dowel pins 54 hold the portion 53 against angular displacement with reference to the portion 52 and the former is biased away from the latter by one, two, three or more helical springs 55. Each of the portions 52, 53 meshes with the feed screw 51 whereby the springs 55 insure that the feed screw cannot wobble in the nut.

The feed screw 51 is further held against axial movement with reference to a bracket 1a or a like supporting member provided on the base 1. As shown in FIG. 6, the feed screw 51 has an annular flange 56 received between two antifriction roller bearings 57, 58 the latter of which is biased towards the former by a cover 59 which is bolted or screwed to the supporting member 1a. The outer end of the feed screw 51 carries a hand wheel 60. The feed screw of the drive for the carriage 14 is shown in FIG. 1, as at 151.

It is clear that each hand wheel 60 can be replaced by other means for rotating the respective feed screw. For example, the feed screw 51 of FIG. 5 can be rotated by an electric motor through the intermediary of a transmission, by a motor through the intermediary of a clutch, or by a reversible motor by way of a multispeed transmission.

Referring again to FIGS. 1 and 2, the upper carriage 14 accommodates an illuminating device 10 which emits horizontal light beams to illuminate a particular portion of the tool mounted in a holder which is held by the chuck 7 or is supported on the top surface 2 adjacent to the side face 4 of the positioning member 3. The carriage 14 further supports an optical locating device 9, for example, a suitable microscope which permits observation of a selected portion of the tool. The locating device 9 is mounted at a level above the illuminating device 10. The measuring plane of the apparatus is horizontal and includes the axis 8 of the spindle 6. This is also the focal plane of the objective system in the locating device 9. If the cutting edge of a tool 12 (FIG. 3) is located in such measuring plane, it is illuminated by the device 10 and can be seen in the observation plane 11 of the locating device 9. A sharp outline of such cutting edge is then visible in the measuring plane. At the same time, the user of the apparatus can see the outline of a reference scale or graticule 13. The outline of the tip of the cutting tool 12 is dark within the graduations of the scale 13. The individual graduations are offset or staggered with reference to each other by the thickness of a graduation so that the inner sides of the inner and outer graduations lie on the sides of a rectangle. A vertical plane including this rectangle is the plane which determines the position of the cutting edge.

The position of graduations relative to a reference point on the support 5, for example, a reference point on the chuck 7 of the spindle 6, is then determined by a measuring means including two graduated scales 18, 19 and two readers or indicators 16, 17. The scale 19 is adjustably mounted in a recess 20 of the base 1 and the corresponding indicator 17 is mounted on a bracket 21 of the lower carriage 15. The latter also supports the indicator 16. The corresponding scale 18 is adjustably secured to the upper carriage 14. The scales 18, 19 are respectively normal to and parallel with the axis 8. The means for supporting the parts 16—19 are preferably designed in such a way that they can accept different types of scales and/or readers.

The measuring means for indicating the positions of carriages 14, 15 may also comprise conventional end measures or dial gauges. Furthermore, the aforedescribed locating means 9 can be replaced by gauges and/or electrical scanning or locating devices.

What is claimed as new and desired to be protected by Letters Patent is set forth in the appended claims.

We claim:

1. Apparatus for facilitating precision mounting of tools in tool holders preparatory to installation of such tool holders in machine tools, said apparatus comprising a base; a pair of tool holder supporting and positioning means on said base and comprising a flat horizontal surface on said base and an elongated positioning member fixed to said surface and having a side face transverse thereto for supporting and positioning one type of tool holder thereon, and a support mounted on said surface and having a spindle mounted thereon turnable about an axis parallel to said surface and said face for releasably holding another type of tool holder therein; first guide means on said base laterally of said flat surface; a first carriage reciprocably and free of play supported by said first guide means; second guide means on said first carriage, one of said guide means extending parallel to said face and the other at right angles to said one of said guide means; a second carriage reciprocably and free of play supported by said second guide means; measuring means for indicating the position of said carriages with respect to said tool holder supporting and positioning means and comprising two measuring devices one of which includes cooperating parts mounted on said base and on said first carriage and the other of which includes cooperating parts mounted on said first and second carriages; and viewing means carried by said second carriage on the side thereof facing said flat surface for facilitating placing of a tool in a predetermined position with reference to a tool holder on either of said pair of tool holder supporting and positioning means.

2. Apparatus as defined in claim 1, wherein each of said guide means comprises a pair of parallel vertical and a pair of parallel horizontal guide faces and including roller bearing means carried by said carriages and having outer races respectively engaging said guide faces for guiding said carriages free of play on the respective guide means.

3. Apparatus as defined in claim 2, wherein each of said carriages is formed with bores substantially normal to said guide faces and including cylindrical carriers mounted in said bores and supporting said roller bearings, and means for preventing turning of said carriers about their axes.

4. Apparatus as defined in claim 3, and including biasing means for biasing the carriers for bearings engaging one of said vertical faces of each of said guide means toward said one vertical face and means for adjusting the distance between the carriers for bearings which engage the other of said vertical guide faces of the respective guide means and said other vertical guide faces.

5. Apparatus as defined in claim 4, wherein two carriers for bearings engaging one of said horizontal guide faces and one carrier for a bearing engaging the other of said horizontal guide faces of each guide means are rigid with the respective carriage, and including biasing means for biasing at least one further carrier of each carriage against the respective horizontal guide face.

6. Apparatus as defined in claim 1, and including drive means for moving said carriages along the respective guide means, each of said drive means comprising a stationary supporting member, a feed screw rotatably mounted in said supporting member, means for holding said feed screw against axial movement in said supporting member, and a spindle nut provided in the respective carriage and comprising a pair of internally threaded portions one of which is fixedly mounted in the respective carriage and the other of which is axially movable in the respective carriage toward and away from said one portion, and resilient means for biasing said other portion axially of said one portion.

7. Apparatus as defined in claim 6, wherein said drive means further comprises a hand wheel on each feed screw.

8. Apparatus as defined in claim 6, wherein said drive means further comprises mechanical means for each feed screw for rotating the same.

9. Apparatus as defined in claim 1, and further comprising illuminating means carried by said second carriage vertically aligned with and below said viewing means, and wherein said viewing means comprises an optical device defining an observation plane and a reference scale to facilitate positioning of a tool with reference to said scale.

10. Apparatus as defined in claim 9, wherein said scale comprises graduations which together form a rectangle, said graduations including a first set of graduations and a second set of graduations staggered with reference to the graduations of said first set by a distance corresponding to the thickness of a graduation.